(12) United States Patent
Siemer et al.

(10) Patent No.: US 11,532,164 B2
(45) Date of Patent: Dec. 20, 2022

(54) GROUP IDENTIFICATION AND MONITORING

(71) Applicant: Alarm.com Incorporated, Tysons, VA (US)

(72) Inventors: James Siemer, Spokane, WA (US); Allison Beach, Leesburg, VA (US); Weihong Yin, Great Falls, VA (US); Jeffrey A. Bedell, Arlington, VA (US); John Stanley, Washington, DC (US)

(73) Assignee: Alarm.com Incorporated, Tysons, VA (US)

( * ) Notice: Subject to any disclaimer, the term of this patent is extended or adjusted under 35 U.S.C. 154(b) by 29 days.

(21) Appl. No.: 17/324,797

(22) Filed: May 19, 2021

(65) Prior Publication Data

US 2021/0374430 A1    Dec. 2, 2021

Related U.S. Application Data

(60) Provisional application No. 63/031,052, filed on May 28, 2020.

(51) Int. Cl.
```
G06K 9/00      (2022.01)
G06V 20/52     (2022.01)
G08B 7/06      (2006.01)
G06K 9/62      (2022.01)
G06V 20/40     (2022.01)
```
(Continued)

(52) U.S. Cl.
CPC .......... *G06V 20/53* (2022.01); *G06K 9/6215* (2013.01); *G06V 20/46* (2022.01); *G06V 40/103* (2022.01); *G06V 40/20* (2022.01); *G08B 7/066* (2013.01)

(58) Field of Classification Search
None
See application file for complete search history.

(56) References Cited

U.S. PATENT DOCUMENTS

2005/0143096 A1    6/2005  Boesch
2009/0041297 A1    2/2009  Zhang et al.
(Continued)

OTHER PUBLICATIONS

PCT International Search Report and Written Opinion in International Appln. No. PCT/US2021/033142, dated Sep. 29, 2021, 8 pages.

(Continued)

*Primary Examiner* — Soo Jin Park
(74) *Attorney, Agent, or Firm* — Fish & Richardson P.C.

(57) ABSTRACT

Methods, systems, and apparatus, including computer programs encoded on a computer storage medium, for group identification and monitoring. The methods, systems, and apparatus include actions of determining, using one or more first frames of a video sequence, that two people each of whom is depicted in at least one of the first frames satisfy a grouping criteria that indicates that the two people should be grouped for video analysis, determining, using one or more second frames of the video sequence at least some of which were captured after the one or more first frames and which depict at least one of the two people, that the two people satisfy a degrouping criteria that indicates that the two people should not be grouped for video analysis, determining that a physical distance between the two people violates a distance criteria, and providing an alert that the distance criteria is violated.

20 Claims, 3 Drawing Sheets

(51) Int. Cl.
*G06V 40/20* (2022.01)
*G06V 40/10* (2022.01)

(56) References Cited

U.S. PATENT DOCUMENTS

2017/0169297 A1 6/2017 Bernal et al.
2018/0374233 A1* 12/2018 Zhou .................. G06T 7/248

OTHER PUBLICATIONS

The Wall Street Journal, "Cameras Redeployed To Police Spacing of Employees," Dow Jones & Company, Inc., May 15, 2020, 3 pages.
Landing.ai, [online] "Landing AI Creates an AI Tool to Help Customers Monitor Social Distancing in the Workplace," Apr. 15, 2020, retrieved from URL <https://landing.ai/landing-ai-creates-an-ai-tool-to-help-customers-monitor-social-distancing-in-the-workplace/>, 4 pages.
Lu, Donna, "US start-up is testing drones in India to enforce social distancing," NewScientist, May 11, 2020, retrieved from URL <https://www.newscientist.com/article/2243058-us-start-up-is-testing-drones-in-india-to-enforce-social-distancing/>, 7 pages.
Camero, Katie, "Keep your distance: Cameras may soon watch you on the job to keep coworkers apart," Apr. 17, 2020, retrieved from URL <https://www.miamiherald.com/news/coronavirus/article242097361.html>, 7 pages.
BBC.com, [online] "Coronavirus France: Cameras to monitor masks and social distancing," May 4, 2020, retrieved from URL <https://www.bbc.com/news/world-europe-52529981>, 15 pages.
News18.com, [online] "AI-Powered CCTV Cameras to Help Shops Maintain Social Distancing in Times of Covid-19," May 3, 2020, retrieved from URL <https://www.news18.com/news/buzz/ai-powered-cctv-cameras-to-help-humans-maintain-social-distancing-in-times-of-covid-19-2603473.html>, 10 pages.
Newman, Jared, "Smart cameras will soon check if your're social distancing and wearing a mask," The Rebuilders, May 13, 2020, retrieved from URL <https://fastcompany.com/90503911/smart-cameras-will-soon-check-if-youre-social-distancing-and-wearing-a-mask>, 8 pages.

* cited by examiner

GROUP IDENTIFICATION AND MONITORING

CROSS-REFERENCE TO RELATED APPLICATIONS

This application claims the benefit of U.S. Provisional Application No. 63/031,052, filed May 28, 2020, which is incorporated by reference in its entirety.

BACKGROUND

Video cameras can capture a video sequence that includes one or more frames, e.g., images. A system can analyze the video sequence to determine content depicted in the video sequence. For instance, a system can analyze frames received from a camera to determine whether the frames depict people.

SUMMARY

An analysis system, e.g., implemented on a camera, can receive a video sequence from a camera and analyze the video sequence to determine groups of people depicted in the video sequence. The analysis system can determine whether the depicted groups of people satisfy one or more criteria and perform automated actions based on the determination. For instance, the analysis system can automatically generate an alert, either audible or visible or both, when two groups of people satisfy a criteria, e.g., when the two groups of people are within a threshold distance of each other.

The analysis system can be trained to determine times, locations, or both, when groups should be detected. For instance, the analysis system can determine, based on training data, that groups of people should not be detected when people first walk into a building, such as a grocery store or a restaurant, because people tend to cluster together after walking through a doorway. The analysis system can determine, based on the training data, when people tend to disperse into separate groups. During runtime, the analysis system can then use data about when people tend to disperse to detect people groups, whether based on a particular location in a building, a time after which the people entered the building, or some other appropriate parameter.

Once the analysis system determines groups of people, the analysis system can perform automated actions based on the groups. For example, when two groups are too close to each other, the analysis system can send an alert to a device for one of the two groups, guide one of the two groups away from the other group, or perform another appropriate action. The device can be a device of a person in one of the groups. The analysis system can guide one of the two groups away from the other using automated barriers, guidance directions, e.g., presented on a sign or audible alerts, or perform another appropriate guidance action.

In general, one innovative aspect of the subject matter described in this specification relates to group identification and monitoring, and can be embodied in methods that include the actions of determining, using one or more first frames of a video sequence, that two people each of whom is depicted in at least one of the first frames satisfy a grouping criteria that indicates that the two people should be grouped for video analysis; after determining that the two people satisfy the grouping criteria, determining, using one or more second frames of the video sequence at least some of which were captured after the one or more first frames and which depict at least one of the two people, that the two people satisfy a degrouping criteria that indicates that the two people should not be grouped for video analysis; after determining that the two people satisfy the degrouping criteria, determining, using one or more third frames of the video sequence at least some of which were captured after the one or more second frames and which depict at least one of the two people, that a physical distance between the two people violates a distance criteria; and in response to determining that a physical distance between the two people violates a distance criteria, providing an alert that the distance criteria is violated.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For instance, in some aspects determining, using one or more first frames of a video sequence, that two people each of whom is depicted in at least one of the first frames satisfy a grouping criteria that indicates that the two people should be grouped for video analysis includes determining that the two people are within a threshold distance for a threshold period of time. In certain aspects, determining that the two people are within a threshold distance for a threshold period of time includes determining that the two people walk through an entrance together and remain together for a threshold period of time.

In some implementations, determining, using one or more first frames of a video sequence, that two people each of whom is depicted in at least one of the first frames satisfy a grouping criteria that indicates that the two people should be grouped for video analysis includes determining that the two people do not correspond to a particular type of person and based on determining that the two people do not correspond to a particular type of person, determining whether the two people are within the threshold distance for the threshold period of time. In certain aspects, determining, using one or more first frames of a video sequence, that two people each of whom is depicted in at least one of the first frames satisfy a grouping criteria that indicates that the two people should be grouped for video analysis includes determining that the two people are both touching a particular object and based on determining that the two people are both touching a particular object, determining that the two people are within a sum of a threshold distance and a length of the particular object for a threshold period of time.

In some aspects, determining, using one or more first frames of a video sequence, that two people each of whom is depicted in at least one of the first frames satisfy a grouping criteria that indicates that the two people should be grouped for video analysis occurs after waiting until a distance threshold is satisfied. In some implementations, after determining that the two people satisfy the grouping criteria, determining, using one or more second frames of the video sequence at least some of which were captured after the one or more first frames and which depict at least one of the two people, that the two people satisfy a degrouping criteria that indicates that the two people should not be grouped for video analysis includes determining that the two people were more than a threshold distance apart for at least a second threshold period of time.

In certain aspects, the video sequence is captured by a camera at a property. In some implementations, actions include after determining that a second set of two people that did not satisfy the degrouping criteria, determining not to provide an alert when the two people of the second set return together after splitting.

The subject matter described in this specification can be implemented in various embodiments and may result in one or more of the following advantages. In some implementations, an analysis system can automatically perform an action based on blobs depicted in an image that satisfy one or more threshold criteria. In some implementations, an analysis system using the methods described in this document can learn criteria for which an automated action should be performed, criteria for which automated actions should not be performed, or both.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
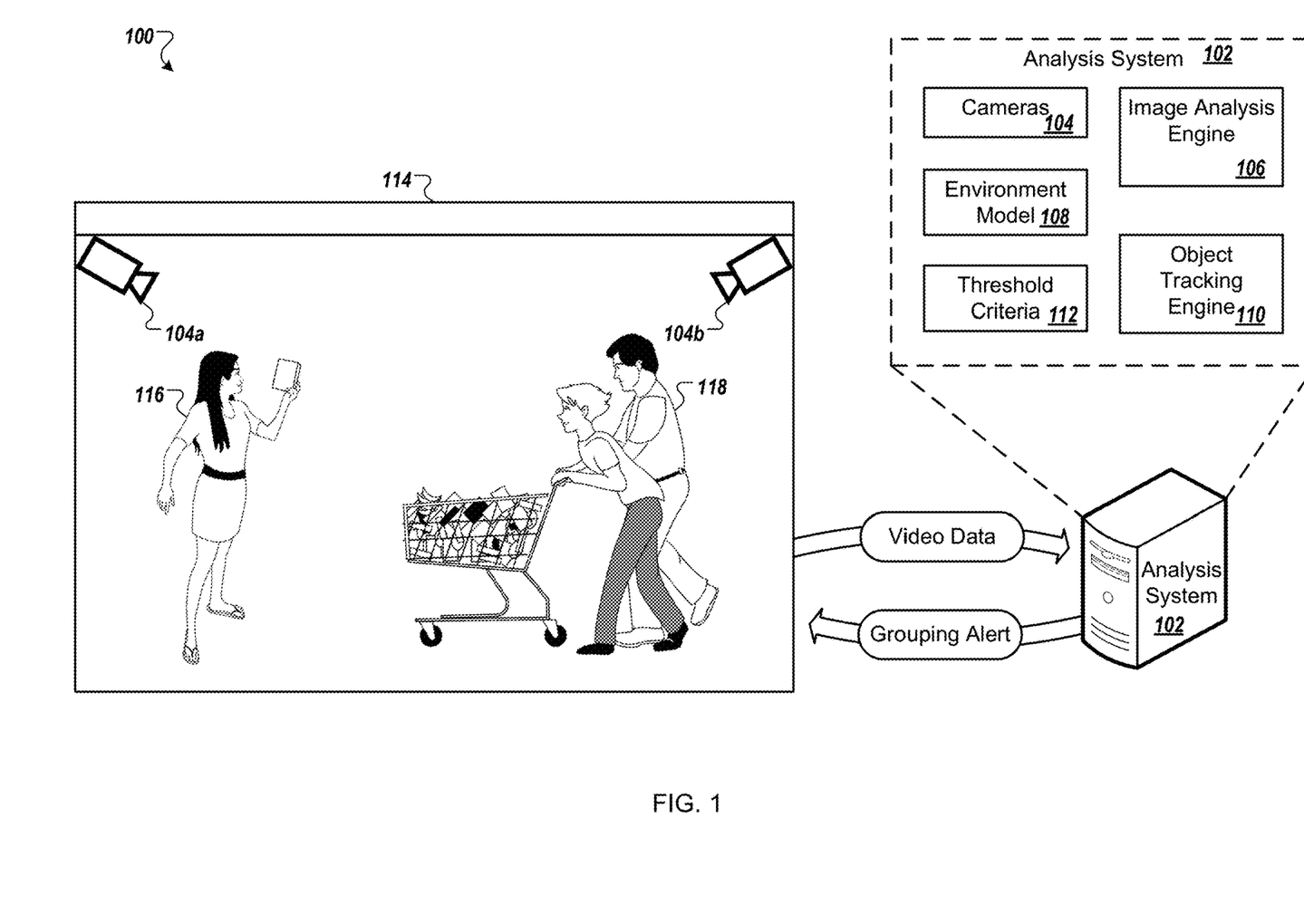
FIG. 1 depicts an example environment in which an analysis system analyzes images to perform group identification and monitoring.

FIG. 1 depicts an example environment 100 in which an analysis system 102 analyzes images to perform group identification and monitoring. The analysis system 102 can automatically perform an action based on people detected in an image, e.g., which people are represented by blobs depicted in the image. A blob can be a continuous set of pixels in an image that represent a person. Although this document refers to analysis based on blobs, the analysis system 102 can perform similar analysis using bounding boxes, image masks, feature embeddings, footprint tracking, head detection, another type of pixel labelling, or a combination of two or more of these, for a person depicted in an image. Such a combination could include blob analysis.

The analysis system 102 can include one or more cameras 104 at a physical location, and optionally other sensors such as microphones, infrared sensors, radar sensors, LIDAR sensors, or motion sensors, at the physical location 114. The sensors capture data about the physical location 114, such as images of the physical location 114, e.g., by the cameras 104 or infrared sensors, sound of the environment that includes the physical location 114, e.g., by the cameras 104 or microphones, or both.

The analysis system 102 uses data from the sensors to determine groups of people depicted in images captured by the cameras 104a-b. A group of people can include a single person or multiple people. The analysis system 102 can use any appropriate image analysis process to determine the groups of people, e.g., using a deep learning model, analysis of pixels in images, or both.

For instance, an image analysis engine 106 included in the analysis system 102 can detect pixels depicted in an image that are different from an environment model 108 of a background for the physical location 114. The environment model 108 can include data that represents the physical location 114 when the physical location 114 does not include any people. The image analysis engine 106 can use the environment model 108 to detect pixels depicted in images that are different from the environment model 108, e.g., the features that represent the physical location 114 without any people.

An object tracking engine 110 in the analysis system 102 can determine groups of people based on groups of pixels that form a blob. The object tracking engine 110 can determine groups of people around a time when the people first enter the physical location 114, after the time when the people first enter the physical location 114, e.g., the object tracking engine 110 can update group data later, or at any other appropriate time.

For example, the analysis system 102 can include a motion sensor that detects movement within the physical location 114. The movement can be based on the person 116 walking into the physical location, e.g., a store, or the person 116 moving within the physical location 114. Based on the movement, the motion sensor can send a signal to the cameras 104, or another component of the analysis system 102, that causes the cameras 104 to send images of the area of the physical location 114 in which the movement was detected to the image analysis engine 106. In some examples, the analysis system 102 does not use a motion sensor. In these examples, the cameras 104 can send a continuous stream of video, e.g., a video sequence, to the image analysis engine 106.

The image analysis engine 106 can analyze data for the images to detect motion at the physical location 114. The image analysis engine 106 can use a learning-based object detection system, e.g., human detection system, for motion analysis and tracking. In some examples, the image analysis engine 106 can analyze images to detect pixels that are different from the environment model 108. The image analysis engine 106 can detect the pixels when the pixels are a different from an expected set of pixels for a corresponding location in the environment model 108. The image analysis engine 106 can detect the pixels depicted in the images when locations of the pixels are moving with respect to subsequent images, e.g., when a person represented in part by the pixels is moving.

For instance, when a person 116 walks into the physical location 114, the image analysis engine 106 can receive images from one or more of the cameras 104a-b that depict the person 116. The images can include multiple pixels that represent the person 116. Because at least some of the pixels that represent the person 116 are different than the environment model 108 of the physical location 114, e.g., pixels or other data that represent the environment model 108, the image analysis engine 106 is able to detect the person using the different pixels. The different pixels can have a different color, a different contrast, or other appropriate different features, compared to the environment model 108.

In some implementations, the image analysis engine 106 can track a target using feature descriptors, e.g., instead of or in addition to comparing pixel data. For instance, the image analysis engine 106 can include a neural network that receives an image as input. The image analysis engine 106 can receive, as output from the neural network, one or more feature descriptors. Each of the feature descriptors can represent a target, e.g., a person. Some examples of feature descriptors can include data that represents a person's shape, size, gait, face, hair, hat style, color, or a combination of two or more of these. An example feature descriptor can include a color histogram that represents a person's clothing. In some examples, a feature descriptor can include hue, saturation, and value ("HSV") data.

The image analysis engine 106 can compare a feature descriptor for an image currently being analyzed with one or more feature descriptors for the environment model 108. When some of the compared feature descriptors are different, the image analysis engine 106 can provide data for the different feature descriptors to the object tracking engine 110.

The image analysis engine 106 can provide data for the pixels to an object tracking engine 110. The object tracking engine 110 can use the data for the detected pixels to create blobs. A blob can be a group of pixels that are within a threshold distance of other pixels in the blob and that are different than the environment model 108 of the physical location 114. For instance, a blob can represent the person 116 or multiple people 118, e.g., who are physically close to each other at the physical location 114. The object tracking engine 110 can determine group data that represents a group of people when the people enter the physical location 114.

The object tracking engine 110 can use modelling data about group movements to determine whether a blob represents a single group of people or multiple groups of people. For example, the object tracking engine 110 can receive, from the image analysis engine 106, data for a first group of pixels and determine that the first group of pixels represents a blob. The object tracking engine 110 can store, in a memory, data that represents the blob, such as data about the feature descriptors for the blob, the size of the blob, or other appropriate data.

As the object tracking engine 110 receives additional pixel data from the image analysis engine 106, the object tracking engine 110 can determine whether a blob continues to represent a single group, has split and potentially represents multiple groups, represents multiple people at the physical location 114, or whether multiple groups, that were each previously represented by different blobs, have merged together. Multiple groups can merge when a first person was dropped off at the physical location 114 by a second person, e.g., who was parking a car, and the second person later joins the first person, e.g., in a store or at a restaurant.

The object tracking engine 110 can use one or more threshold criteria 112 to determine whether a blob represents a single group or multiple groups or whether to merge groups or separate a group into multiple groups. The threshold criteria 112 can include grouping criteria that indicate (i) when the object tracking engine 110 should create a group, e.g., associated with multiple blobs. The threshold criteria 112 can include criteria that indicate when a single blob likely represents data for multiple people. The threshold criteria 112 can include degrouping criteria that indicate when the object tracking engine 110 should have separate groups for multiple blobs that were previously associated with a single group. The threshold criteria 112 can be values determined during training of the object tracking engine 110, e.g., using a machine learning engine.

In some examples, the threshold criteria 112 can indicate that some groups, e.g., family groups, often move together at a consistent pace and become stationary together. Using this threshold criteria 112, the object tracking engine 110 can temporarily determine to associate multiple people 116, 118 with a single group when the two people 118, e.g., a parent with a child, enter the physical location 114 together and a third independent person 116 enters right behind them. As the multiple people 116, 118 move through the physical location, the object tracking engine 110 continues to receive pixel data that represents the people from the image analysis engine 106. The object tracking engine 110 can determine, using the pixel data, feature descriptors, or both, that the two people 118, e.g., the parent child pair, move through the physical location 114 together, while the third person 116 either pauses to create space to give the two people 118 some room, or tries to walk past the two people 118 to pass them. Because the third person 116 does not move together with the two people 118 at a consistent pace and for more than a threshold period of time, the object tracking engine 110 can determine that the three people are not likely in a single group and remove the temporary grouping.

The object tracking engine 110 can analyze objects using velocity vectors. A velocity vector can include data for a direction of movement and data for a speed of movement. The object tracking engine 110 can use the velocity vectors to track a person's movement, e.g., footprint. For instance, the object tracking engine 110 can determine that a first representation of a person, e.g., pixel data or feature descriptor, for a first sequence of images has a first velocity vector. The object tracking engine 110 can determine that a second representation of a person for a second sequence of images has a second velocity vector. The object tracking engine 110 can determine, when a difference between the first velocity vector and the second velocity vector satisfies a threshold distance, that the first representation and the second representation are likely for the same person, e.g., when the two representations are for content depicted in a similar area between the first sequence of images and the second sequence of images.

The velocity vector can be represented by any appropriate type of data. For instance, the object tracking engine 110 can calculate a velocity vector in pixel space, e.g., using a change in pixels per frame with a direction in x-y coordinates. The object tracking engine can calculate a velocity vector by projecting the representation of the person into a physical space, e.g., represented by the environment model 108. The object tracking engine 110 can use, when the velocity vector projected into a physical space, feet per second with a direction in degrees.

When the object tracking engine 110 determines that pixels representing people associated with a temporary group continue to move together, e.g., in a consistent manner, for at least a threshold period of time, based on the threshold criteria 112, the object tracking engine 110 can update the temporary group to a stable group. The object tracking engine 110 can include labels for a group. The labels can include temporary, stable, or other appropriate labels. The object tracking engine 110 can use the labels to determine different types of groups and update the group type based on additional data from the image analysis engine 106.

The object tracking engine 110 can analyze data for multiple different groups and determine whether threshold criteria 112 for the different groups apply. The object tracking engine 110 can analyze data that represents two different stable groups to determine whether data for the two different groups satisfies a threshold criteria 112. For instance, the object tracking engine 110 can determine whether a distance between the two different groups satisfies a threshold criteria 112, e.g., is less than or equal to a threshold distance criteria. The distance can be a distance at a particular time or an average distance for a period of time.

When the object tracking engine 110 determines that data for the multiple different groups satisfies a threshold criteria 112, the object tracking engine 110 can perform an automated action. For example, the object tracking engine 110 can label the two groups as satisfying a threshold criteria 112. The label can indicate the particular threshold criteria 112 that was satisfied. The object tracking engine 110 can send an alert that indicates that the threshold criteria 112 was satisfied. For instance, the object tracking engine 110 can send an alert to a computing device, e.g., operated by a person in one of the groups or an employee at the physical location 114, that indicates the threshold criteria 112 that was satisfied.

The analysis system 102, e.g., the image analysis engine 106 or the object tracking engine 110, can determine estimated location data for a pixel, a blob, or both. The estimated location data can represent an estimated location of a person 116 who is represented by the pixel, by the blob, or both. For instance, when the image analysis engine 106 receives images data from the cameras 104, the image analysis engine 106 can determine estimated locations for pixels represented by the image data such that the locations are in the environment model 108. The image analysis engine 106 can use any appropriate process to determine the estimated locations.

The image analysis engine 106 can determine depth data for an image using pixel data, feature descriptors, or both, for a representation of a person, e.g., a blob. For instance, when an image analysis engine 106 detects a blob depicted in an image, the image analysis engine 106 can use data for the bottom most pixels in the blob, the top most pixels in the blob, other pixels in the blob, or a combination of these, to determine an estimated location for the blob. In some examples, the image analysis engine 106 can use three-dimensional modelling to determine the estimated location for the blob. For example, the image analysis engine 106 can use a footprint projection of a representation of a person into the environment model 108 to determine the estimated location for the representation.

The object tracking engine 110 can use an estimated location for a blob to determine whether the estimated location satisfies a threshold criteria 112, or whether multiple estimated locations together satisfy a threshold criteria 112. For example, the object tracking engine 110 can use the estimated locations for two blobs to determine an estimated distance between the two blobs, and whether the estimated distance satisfies a threshold distance.

In some implementations, the object tracking engine 110 can determine whether a distance between two blobs satisfies a threshold distance combined with a length of an object that connects the two blobs. For instance, when two people 118 are both touching a cart, a table, or a chair, the object tracking engine 110 can receive blob data for each of the two people and blob data for the object that connects the two people. The object tracking engine 110 can determine the distance between the two people 118, e.g., when one person is at the front of the cart and the other is pushing the cart. When the distance between the two people is less than a combination, e.g., sum, of the threshold distance and the length of the object, the object tracking engine 110 can determine that the blobs for the two people satisfy the threshold distance.

The object tracking engine 110 can use one or more video analytics algorithms to track a person's interactions with an object. When the object tracking engine 110 determines that two or more people interact with the same object, the object tracking engine 110 can use that coordinated interaction as an indication that the people involved in the interaction are in the same group of people.

The object tracking engine 110 can use a size of a blob to determine one or more properties for the blob. For instance, when a blob size satisfies a first size threshold, e.g., is smaller than the first size threshold, the object tracking engine 110 can determine that the blob likely represents a single person 116. When a blob size satisfies a second size threshold, e.g., is greater than the second size threshold, the object tracking engine 110 can determine that the blob likely represents multiple people 118, e.g., who are moving together.

When a blob size does not satisfy either the first size threshold or the second size threshold, the object tracking engine 110 can determine that more data for the blob is needed. The object tracking engine 110 can receive additional pixel data from the image analysis engine 106 for the blob and update data for the blob accordingly. For example, the object tracking engine 110 can determine whether a size of the blob changes over time. If so, the object tracking engine 110 can determine that the blob likely represents multiple people. If not, the object tracking engine 110 can determine that the blob likely represents a single person.

The image analysis engine 106, the object tracking engine 110, or both, can assign identifiers to blobs. The identifiers can enable the analysis system 102 to track a blob across multiple images from a video sequence captured by the cameras 104. The identifier can be a random identifier that does not include any identifying information about the people represented by the blob.

The analysis system 102 can store, with the identifier, e.g., in a short-term memory, data that enables the analysis system 102 to track a blob between images. The data associated with the blob can represent a signature for the blob that enables detection of the blob. For instance, the data can indicate a size for the blob, e.g., in a number of pixels, one or more colors for the blob, or other appropriate data that enables the analysis system 102 to track a blob between images. The analysis system 102 deletes the identifier, and the data that enables tracking the blob between images, once the blob has not been depicted in an image captured by one of the cameras 104 for more than a threshold period of time.

When the image analysis engine 106 detects moving pixels, e.g., that are different than a background represented by the environment model 108, the object tracking engine 110 can associate the pixels with an existing blob identifier or with a newly generated blob identifier. For instance, the object tracking engine 110 can determine whether the pixels are likely associated with an existing blob based on the blob's signature. When the object tracking engine 110 determines that the blob is likely associated with an existing blob, the object tracking engine 110 can determine whether the blob satisfies at least some of the threshold criteria 112.

When the object tracking engine 110 determines that the blob is not likely associated with an existing blob, the object tracking engine 110 can generate an identifier for the blob, create a signature for the blob, or both. The object tracking engine 110 can perform analysis as described in more detail with respect to FIG. 2, below.

The analysis system 102 can be at the physical location 114. For instance, when the physical location 114 includes a single camera 104a, the analysis system 102 can be implemented on the camera 104a. In these examples, the environment model 108 can be a two-dimensional model that represents the portions of the physical location 114 depicted in images captured by the single camera 104a.

When the physical location 114 includes multiple cameras 104a-b, the analysis system 102 can receive video sequences from each of the multiple cameras 104a-b. The analysis system 102 can be either at the physical location 114 or geographically separated from the physical location 114, e.g., the analysis system 102 can be part of a cloud computing system. The environment model 108 can be a two-dimensional model that includes data for each of the multiple cameras 104a-b. The environment model 108 can be a three-dimensional model that includes data for each of the multiple cameras 104a-b.

In some implementations, the analysis system 102 can enable entities, e.g., businesses, to track a proximity between groups of people, a system for an entity to perform automated actions for a group of people, e.g., guide the group to a particular area, or both. The analysis system 102 can include threshold criteria 112 that are predetermined or learned for the environment 100 that is specific to the entity. For instance, a first entity can have a first number of threshold criteria 112, with first values for the threshold criteria, and a second, different entity can have a second number of threshold criteria 112, with second values for the threshold criteria, at least some of which can be different from the first values.

The first entity can include a threshold criteria 112 that indicates that the analysis system 102 should generate an alert when more than a small people group, e.g., more than four people, gather in an area for more than a threshold amount of time. The second entity can include a threshold criteria 112 that indicates that the analysis system 102 should generate an alert when a group of more than ten people is formed.

A threshold criteria 112 can indicate that an alert should be generated when two people are within six feet of each other. A threshold criteria 112 can indicate that, irrespective of other threshold criteria, an alert need not be generated when people pass each other in a narrow area, e.g., less than six feet apart. The analysis system 102 can determine when a blob represents a person passing through a narrow area using data for the environment model 108. For instance, the environment model 108 can include image data, used to determine when pixels in an image are different from a typical background, e.g., color, and data that indicates a size of areas represented by the environment model 108. In some examples, the analysis system 102 can analyze data for the environment model 108 to determine whether background features indicates that an area is narrow, e.g., based on the types of features depicted in the background, such as a door, or walls or other objects that create a corridor or hallway.

A threshold criteria 112 can indicate that an alert should be generated when a person is within a threshold distance of other people for more than a threshold amount of time, e.g., that people are not permitted to loiter near each other. A threshold criteria 112 can indicate that an alert should be generated when a person is within a certain physical area for more than a threshold amount of time, e.g., irrespective of whether other people are in the area.

The analysis system 102 can perform any appropriate type of action to generate an alert. The action can be based on the threshold criteria 112 that is satisfied. For instance, the analysis system 102 can generate an automated audio message that reminds people to move further apart or separate into a smaller group when a threshold distance criteria or a threshold grouping criteria is satisfied. Some other actions for the analysis system 102 include physical automation, such as lights turning on or off, or changing light colors, updating digital signage, or moving or creating a physical barrier, e.g., locking or unlocking a turn-style to control people's movement within, the number of people who may enter, or both, the physical location 114.

The analysis system 102 can generate an audible alert. The analysis system 102 can provide data for the audible alert to a speaker at the physical location 114, e.g., an overhead speaker.

The analysis system 102 can generate a notification for presentation on a computing device. The analysis system 102 can provide data for the notification to a device of a person whose associated blob satisfies a threshold criteria, e.g., using near field communication such as Bluetooth, devices of multiple people whose associated blob satisfies a threshold criteria, e.g., each person in a group, or a device operated by another person, e.g., an administrator.

In some examples, the analysis system 102 can generate alert data for later review. For instance, the analysis system 102 can generate alert data for later review by an administrator, an employee of the physical location 114, or another appropriate person. The analysis system 102 can use the alert data during training, e.g., to determine new threshold criteria 112, actions to perform when threshold criteria 112 are satisfied, or both.

In some implementations, the analysis system 102 can perform an action based on the severity for the threshold criteria 112 that is satisfied. For instance, when the analysis system 102 first determines that a threshold criteria 112 is satisfied, the analysis system 102 can have a lowest severity level. If the threshold criteria 112 is satisfied for more than a predetermined period of time, e.g., after detection that the threshold criteria 112 was initially satisfied, the analysis system 102 can change a severity level for the event to a medium severity level. The analysis system 102 can then perform an action based on both the satisfied threshold criteria 112 and the updated severity level.

The analysis system 102 can determine the severity level based on any appropriate criteria. For instance, the severity level can be based on an amount of time for which the threshold criteria 112 has been satisfied. The severity level can be based on a distance associated with a threshold criteria 112. For example, the analysis system 102 can perform a first action when two blobs indicate that respective groups are likely less than six feet apart and perform a second, different action when two blobs indicate that respective groups are likely less than four feet apart.

In some implementations, the analysis system 102 can generate alerts based on a percentage associated with a threshold criteria 112. For instance, the analysis system 102 can generate a first alert when the physical location 114 is at thirty-three percent occupancy, a second alert when the physical location 114 is at fifty percent occupancy, and so on. For a distance threshold criteria 112, the analysis system 102 can generate a first alert upon determining that the distance threshold is likely satisfied and the analysis system can generate a second alert upon determining that, based on a distance between two blobs, an estimated distance between the two corresponding groups is likely less than seventy-five percent of the distance threshold.

In some implementations, the analysis system 102 can automatically determine some of the threshold criteria 112 for the physical location 114. For example, as the analysis system 102 analyzes video sequences from the cameras 104, the analysis system 102 can determine potential issues that are specific to the physical location 114 and actions to perform to reduce a likelihood of those potential issues. The analysis system 102 can then generate threshold criteria 112 for use identifying patterns in a video sequence, using blob data, or both, that satisfy at least a threshold likelihood of resulting in those potential issues.

For example, the analysis system 102 can determine a total permitted occupancy for the physical location 114, a number of people permitted to enter the physical location 114 per hour, or other appropriate threshold criteria 112 based on pattern analysis. In some examples, one or more of these threshold criteria 112 can be predetermined. For instance, the analysis system can have a threshold criteria 112 that indicates a particular person type, e.g., seniors, are allowed access to the physical location 114 during particular times. When the analysis system 102 detects a blob that represents a person who does not below to the particular person type, the analysis system 102 can move, e.g., close, or determine not to move, e.g., keep closed, a barrier to prevent the person's access to the physical location 114 or a portion of the physical location 114.

In some implementations, the analysis system 102 can have different threshold criteria 112 for different parts of the physical location 114. For instance, the analysis system can have a first maximum occupancy for a first area in the physical location 114 that is different than a second maximum occupancy for a second area in the physical location 114.

In some implementations, a threshold criteria 112 can include movement direction criteria. The threshold criteria 112 can indicate that people should only move in a particular direction in certain parts of the physical location 114, e.g., people should only move north down a particular grocery store aisle. The analysis system 102 can generate an alert upon determining that a blob entered the part while moving in the wrong direction, is likely to enter the part moving in the wrong direction, or has moved through the part of the physical location 114 moving in the wrong direction for more than a threshold amount of time. In some examples, the analysis system 102 can generate an alert upon determining that a blob entered the part of the physical location 114, e.g., represented by the environment model 108, when another blob is in the part of the physical location. The analysis system can determine to skip generating the alert when only the blob moving in the wrong direction is likely in the part of the physical location 114.

In some implementations, the analysis system 102 can use data about the cameras 104 to determine an estimated location for a blob in the environment model 108, an estimated distance between two blobs, e.g., that represents an estimated distance between corresponding groups of people, or both. For instance, the analysis system 102 can use a camera angle, a camera height, e.g., from the floor of the physical location 114, a camera focal length, or a combination of two or more of these, to determine an estimated blob location.

The analysis system 102 can use a camera angle, a camera height, a camera focal length, or a combination of these, to determine an estimated length represented by a pixel in an image. In some examples, some pixels in an image can have different corresponding lengths, e.g., when a camera 104 has a fisheye lens. The analysis system 102 can use a ground plane homography to estimate an estimated length, e.g., in feet or inches or another appropriate spatial distance.

In some implementations, the analysis system 102 can assign an identifier to a person, instead of or in addition to assigning an identifier to a blob, e.g., when a blob represents multiple people. The analysis system 102 can use the identifier, and other data for the person, such as a feature descriptor or embedding, to generate alerts. As with the blob data, the analysis system 102 stores the data in a short-term memory and deletes the data after a predetermined period of time during which the person is not depicted in an image captured by the cameras 104.

In some implementations, a single component of the analysis system 102 can detect pixels and analyze blobs. For instance, the image analysis engine 106 and the object tracking engine 110 can be part of a single component. In some implementations, the image analysis engine 106 and the object tracking engine 110 are part of separate components.

The analysis system 102 is an example of a system implemented as computer programs on one or more computers in one or more locations, in which the systems, components, and techniques described in this document are implemented. In some examples, the analysis system can be implemented on one of cameras 104a-b, e.g., can be integrated with a camera, or on multiple cameras 104a-b. A network (not shown), such as a local area network (LAN), wide area network (WAN), the Internet, or a combination thereof, can connect the cameras 104 and the analysis system 102, e.g., when the analysis system 102 is not integrated into a camera 104. In these examples, the analysis system 102 may use a single server computer or multiple server computers operating in conjunction with one another, including, for example, a set of remote computers deployed as a cloud computing service.

The analysis system 102 can include several different functional components, including the image analysis engine 106 and the object tracking engine 110. The image analysis engine 106, the object tracking engine 110, or a combination of these, can include one or more data processing apparatuses. For instance, each of the image analysis engine 106 and the object tracking engine 110 can include one or more data processors and instructions that cause the one or more data processors to perform the operations discussed herein.

The various functional components of the analysis system 102 may be installed on one or more computers as separate functional components or as different modules of a same functional component. For example, the image analysis engine 106 and the object tracking engine 110 can be implemented as computer programs installed on one or more computers in one or more locations that are coupled to each through a network when the analysis system 102 is not integrated into a camera 104. In cloud-based systems for example, these components can be implemented by individual computing nodes of a distributed computing system.

In some implementations, the analysis system can be implemented on a single camera; distributed among several cameras; distributed between camera(s) and a local processing system, e.g., at a physical location; distributed between camera(s), a local processing system and a cloud based system; distributed between camera(s) and cloud based system; or some other appropriate type of distribution between devices.

Figure 2:
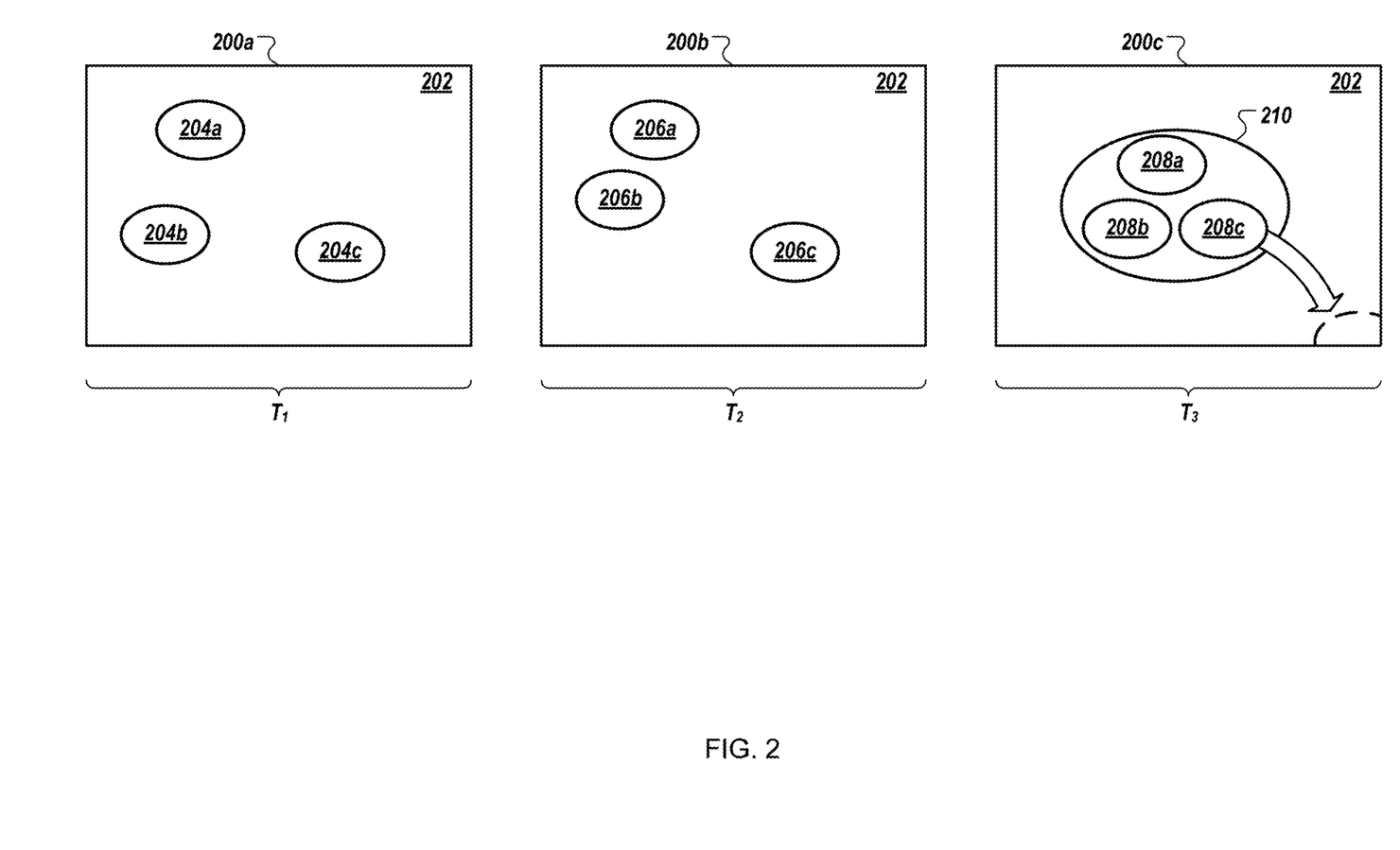
FIG. 2 depicts images of example environments, each with multiple blobs.

FIG. 2 depicts images of example environments 200a-c, each with multiple blobs 204a-c, 206a-c, and 208a-c. The environments 200a-c can represent an environment model, e.g., the environment model 108, with blobs superimposed on top of the environment model. As described above, an analysis system can analyze other data for an image that represents an object, such as a person, instead of or in addition to blob data. For instance, an analysis system can use a bounding box, image mask, footprint tracking, head detection, another pixel labelling process, or a combination of two or more of these.

When an analysis system receives data for a first environment 200a, e.g., for a first time period $T_1$, the analysis system can use background data 202 for the first environment 200a to detect multiple blobs 204a-c in the environment 200a. The analysis system can determine that each of the blobs 204a-c is at least a threshold distance from the other blobs. For instance, the analysis system can determine that a first blob 204a is at least a threshold distance from the second blob 204b and the third blob 204c.

When the analysis system determines that each of the blobs 204a-c is at least a threshold distance from the other blobs 204a-c, the analysis system can determine that none of the blobs 204a-c should be grouped with the other blobs 204a-c. The analysis system can determine that each group is represented by a single blob. The analysis system can determine that each group is associated with only a single person.

When the analysis system receives data for a second environment 200b, e.g., for a second time period $T_2$, the analysis system can determine that some of the blobs 206a-c are within the threshold distance of another blob. For example, the analysis system can determine that a first blob 206a is within a threshold distance of a second blob 206b, e.g., when the distance between the first blob 206a and the second blob 206b is less than, equal to, or either, the threshold distance. The analysis system can use any appropriate threshold distance. In some examples, the threshold distance is 1.5 feet.

Upon determining that the first blob 206a is within the threshold distance of the second blob 206b, the analysis system can create data for a group that represents the two blobs 206a-b. For instance, the analysis system can mark the two blobs 206a-b as one group and assign the two blobs to a group identifier. The analysis system can then continue processing image data for the two blobs while treating the two blobs as a group, e.g., and the people represented by the blobs as a group.

The group can have a label that indicates a status of the group. A "stable" label can indicate that the analysis system determined that there is a high likelihood that the group will not change, e.g., that no blobs will be added to, removed from, or both, the group. A "disappearing" label can indicate that a blob that was formerly part of the group has not satisfied one or more group criteria for at least a threshold period of time, e.g., that the blob has been more than a threshold distance from other blobs in the group for the threshold period of time.

This can enable the analysis system to generate alerts differently for a group associated with multiple blobs compared to two separate blobs that are not part of the same group, e.g., based on threshold criteria. For example, the analysis system can determine to generate an alert if the third blob 206c is depicted in an image less than a second threshold distance away from either the first blob 206a or the second blob 206b even though the analysis system does not determine to generate an alert when the first blob 206a is less than the second threshold distance away from the second blob 206b because the two latter blobs are associated with the same group.

When the analysis system receives data for a third environment 200c, e.g., for a third time period $T_3$, the analysis system might detect only a single blob 210, e.g., based on the closeness of the pixels for three blobs 208a-c. The analysis system can label the single blob 210 as a group blob based on the size of the blob. For instance, when the blob size is greater than a threshold size, the analysis system can determine that the single blob 210 likely represents multiple blobs, e.g., potentially overlapping blobs, but because of the distance between the blobs 208a-c, the analysis system is only able to detect a single blob.

When the blob size is greater than a threshold size, the analysis system can create data for a group and label the group as a likely group. The label can indicate that the group likely includes multiple blobs, e.g., represents multiple people, but that the analysis system currently does not have sufficient data for all of the blobs in the group.

As the analysis system analyzes additional image data for the single blob 210, e.g., as the group of people represented by the single blob 210 moves away from an entrance to a physical location through which the people just moved, the analysis system can update the group data for the single blob 210. For instance, the analysis system can determine that the single blob 210 represents three separate blobs 208a-c.

If the analysis system determines that a blob, e.g., the third blob 208c, has been more than a threshold distance away from the other blobs 208a-b in the group for at least a threshold period of time, the analysis system can change the label for the group. For instance, the analysis system can change the label from "stable" to "disappearing" to indicate that a blob moved away from the other blobs and satisfies a threshold likelihood of not being associated with the other blobs.

When one blob moves away from the other blobs, the analysis system can create group data for the other blob. For instance, when the third blob 208c moves away from the other two blobs 208a-b, the analysis system can create new group data for the third blob 208c. The analysis system can maintain the group data for the first blob 208a and the second blob 208b. The analysis system can include, in the group data for both groups, association data that indicates that the two groups were previously part of a single group.

The analysis system can use the association data to later determine whether multiple blobs should again belong to the same group. For example, the analysis system can use grouping criteria to determine when multiple blobs are associated with the same group. However, when two blobs have association data that indicates that the two blobs were previously part of the same group, the analysis system can use relaxed grouping criteria to determine if the two blobs are associated with the same group.

In some examples, a group can have multiple labels. For instance, when a group first includes data for three blobs 208a-c, the group can have a stable label. When one of the blobs 208c satisfies a degrouping criteria, e.g., is at least a threshold distance from the other blobs 208a-b for at least a threshold period of time, the analysis system can add a "disappearing" label to the group. In some implementations, the analysis system can use a single label to indicate that the group has stable elements and disappearing elements, e.g., a "transition" label.

The analysis system can use one or more criteria to determine whether to group or degroup blobs. For example, the analysis system can use one or more grouping criteria to determine when to associate multiple blobs with a single group. The grouping criteria can include temporal, spatial, or both, criteria. The analysis system can use one or more degrouping criteria to determine when multiple blobs should no longer be associated with a single group. The degrouping criteria can include temporal, spatial, or both, criteria that, when satisfied, indicate that the analysis system should maintain separate group data for blobs that are no longer associated with a single group.

Figure 3:
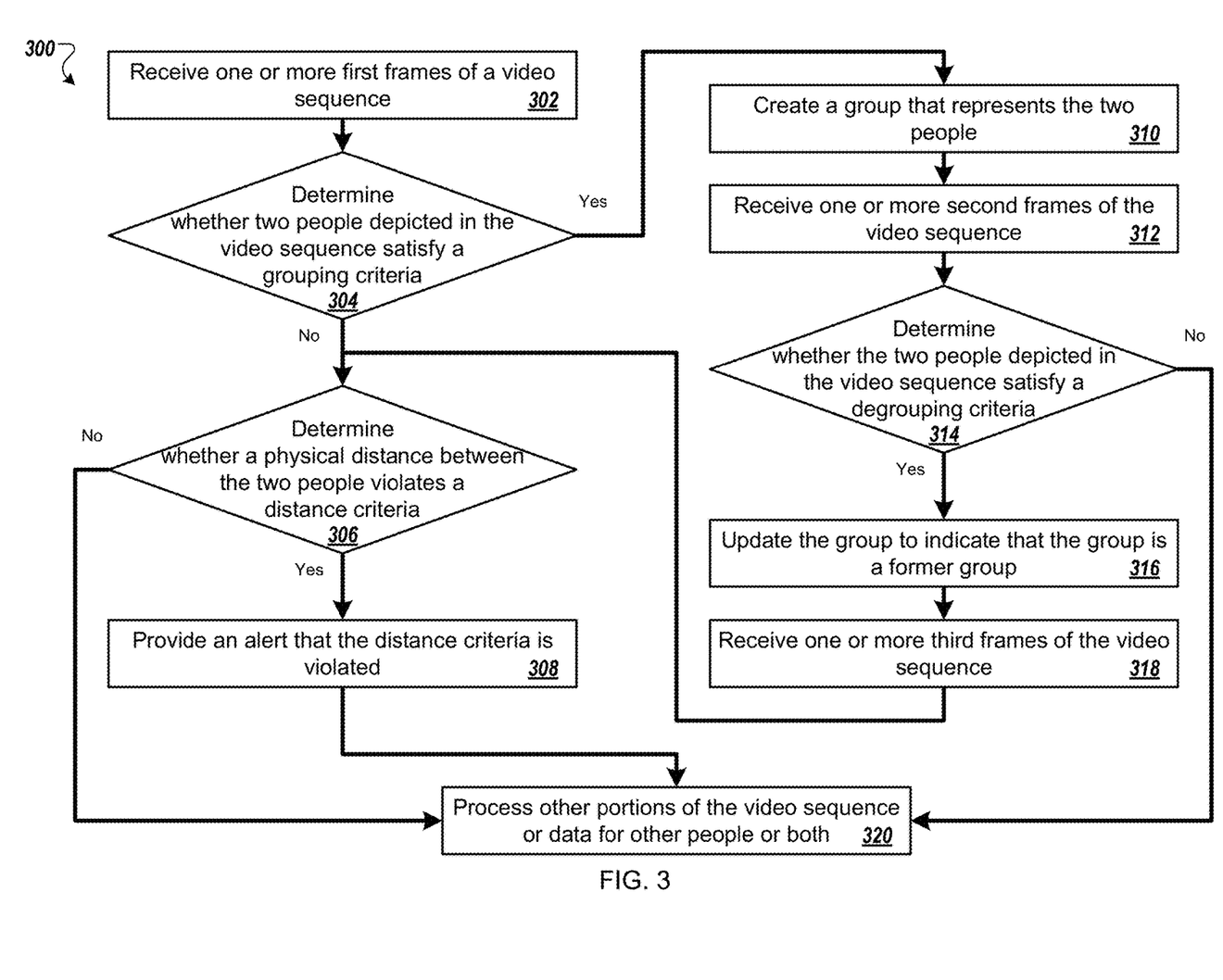
FIG. 3 is a flow diagram of a process for group identification and monitoring.

FIG. 3 is a flow diagram of a process 300 for group identification and monitoring. For example, the process 300 can be used by the analysis system 102 from the environment 100.

An analysis system receives one or more first frames of a video sequence (302). For instance, a camera can capture the first frames and provide the first frames to the analysis system. In multi-camera implementations, the analysis system can receive some of the first frames from a first camera and others of the first frames from a second, different camera. In some implementations, the video sequence is captured by a camera at a property. For example, the video sequence may be captured by a camera at a restaurant.

The analysis system determines whether two people depicted in the video sequence satisfy a grouping criteria (304). For example, the analysis system determines groups of pixels that form a blob. Each blob can represent one or more people, e.g., based on a size of the blob.

In some implementations, determining, using one or more first frames of a video sequence, that two people each of whom is depicted in at least one of the first frames satisfy a grouping criteria that indicates that the two people should be grouped for video analysis includes determining that the two people are within a threshold distance for a threshold period of time. For example, the grouping criteria can be a threshold distance for a threshold period of time and the analysis system determines that the blobs for the two people are within the threshold distance for at least the threshold period of time, the analysis system can determine that the two people satisfy the grouping criteria.

In some implementations, determining that the two people are within a threshold distance for a threshold period of time includes determining that the two people walk through an entrance together and remain together for a threshold period of time. For example, the analysis system can determine that the two people satisfy a grouping criteria that indicates that people who walk through a door together and remain together for a threshold period of time are likely in a group.

In some implementations, determining, using one or more first frames of a video sequence, that two people each of whom is depicted in at least one of the first frames satisfy a grouping criteria that indicates that the two people should be grouped for video analysis includes determining that the two people do not correspond to a particular type of person and based on determining that the two people do not correspond to a particular type of person, determining whether the two people are within the threshold distance for the threshold period of time. For example, the analysis system may determine that both of the two people are not employees of a restaurant that is being monitored and, based on that determination, determine whether the two people should be grouped.

In some implementations, determining, using one or more first frames of a video sequence, that two people each of whom is depicted in at least one of the first frames satisfy a grouping criteria that indicates that the two people should be grouped for video analysis includes determining that the two people are both touching a particular object and based on determining that the two people are both touching a particular object, determining that the two people are within a sum of a threshold distance and a length of the particular object for a threshold period of time. For example, the analysis system may determine that one person is touching a front of a shopping cart and a second person is pushing on a back of a shopping cart and in response, instead of determining whether the two people are within a threshold distance of four feet determine whether the two people are within a distance of nine feet, a sum of a five foot length of the shopping cart and the threshold distance of four feet.

In some implementations, determining, using one or more first frames of a video sequence, that two people each of whom is depicted in at least one of the first frames satisfy a grouping criteria that indicates that the two people should be grouped for video analysis occurs after waiting until a distance threshold is satisfied. For example, the analysis system can wait to analyze data for people who walked through a door until a distance threshold is satisfied. The distance threshold can be a time distance threshold, e.g., five seconds after both people walked through the door. The distance threshold can be a spatial distance threshold, e.g., three feet. The distance threshold can be predetermined, e.g., based on input received from an administrator. In some implementations, the analysis system can learn the distance threshold in training, e.g., based on analysis of images that depict people in the same physical location.

In some implementations, determining people satisfy a grouping criteria may be based on orientation of the people. For example, two people that are facing each other or in a common direction may be determined to be more likely to be in a group, and the grouping criteria may include that people are facing each other or in a common direction.

In response to determining that the two people depicted in the video sequence do not satisfy the grouping criteria, the analysis system can determine whether a physical distance between the two people violates a distance criteria (306). For instance, the analysis system determines an estimated physical distance between the two people using a distance between the blobs that represent the respective person.

In response to determining that the physical distance between the two people violates the distance criteria, the analysis system provides an alert that the distance criteria is violated (308). For example, the analysis system can generate an alert that indicates that the distance criteria is violated. The analysis system can provide data for the alert to computing devices, e.g., smart phones, for one or both of the two people. In some examples, the analysis system can provide data for the alert to another person, e.g., an employee of the physical location. In some examples, the analysis system can present content for the alert on a visual display, audibly, e.g., using an overhead speaker, or perform another appropriate action.

In response to determining that the two people depicted in the video sequence satisfy the grouping criteria, the analysis system creates a group that represents the two people (310). The analysis system can include, with data for the group, a group identifier, a group signature, or both.

The analysis system receives one or more second frames of the video sequence (312). For instance, the analysis system receives the second frames from a camera. The analysis system can receive the second frames from the same camera or a different camera than the camera from which the analysis system received the first frames.

The analysis system determines whether the two people depicted in the video sequence satisfy a degrouping criteria (314). For example, the analysis system may determine that two people that came in together through an entrance but then immediately separated satisfy a degrouping criteria. In some implementations, determining, using one or more second frames of the video sequence at least some of which were captured after the one or more first frames and which depict at least one of the two people, that the two people satisfy a degrouping criteria that indicates that the two people should not be grouped for video analysis includes determining that the two people were more than a threshold distance apart for at least a second threshold period of time. For example, the analysis system determines whether the two people were more than a nine feet apart for at least twenty seconds.

In response to determining that the two people depicted in the video sequence satisfy the degrouping criteria, the analysis system updates the group to indicate that the group is a former group (316). The analysis system can delete data for the group. The analysis system can update a label for the group to indicate that one of the people left the group, e.g., to a disappearing label. The analysis system can otherwise update data for the group to indicate that the group is a former group or that one person left the group when the group previously represented more than two people.

In some implementations, the analysis may preserve the group identifiers that belong to groups that split in order to regroup a set of individuals. If the individuals were shopping as a group, then the individuals separated to pick-up different items, such as going down two separate grocery store aisles, the individual's original group may be marked as split while shopping separately, but then the individuals may be regrouped once they began shopping together again and the original group identifier would be preserved. The regrouping may be determined by the analysis system more quickly due to preserving the previous group identifiers.

The analysis system receives one or more third frames of the video sequence (318). For instance, the analysis system receives additional frames of the video sequence and then determines whether the two people, who were formerly in a single group, violate the distance criteria, e.g., by performing step 306.

The analysis system processes other portions of the video sequence or data for other people or both (320). The analysis system can process other portions of the video sequence in response to determining that the two people depicted in the video sequence satisfy the degrouping criteria, in response to determining that the physical distance between the two people does not violate the distance criteria, after providing an alert that the distance criteria is violated, or a combination of two or more of these.

The order of steps in the process 300 described above is illustrative only, and group identification and monitoring can be performed in different orders. For example, the analysis system can perform step 314 before performing step 306.

In some examples, when the analysis system has data for multiple different groups, multiple different cameras, or both, the analysis system can perform some of the steps in the process 300 substantially concurrently. For instance, the analysis system can determine whether two people satisfy a degrouping criteria while determining whether two other people satisfy a grouping criteria. The people can be different people, e.g., four different people. One person can be part of the same analysis, e.g., when the analysis system determines whether a first person should be grouped with a second group and should be removed from a group with a third person. This can occur when multiple people walk into a physical location through a doorway that restricts the flow of people.

In some implementations, the process 300 can include additional steps, fewer steps, or some of the steps can be divided into multiple steps. For example, the analysis system can perform steps 304, 310, and 314 without performing the other steps in the process 300. In some examples, the analysis system can perform steps 304, 310, 314, 306, and 308 without performing the other steps in the process 300.

In some implementations, the analysis system can include one or more criteria for a type of people for which the analysis system should not generate alerts, or should generate different alerts. For instance, the analysis system can include criteria for employees of a physical location that indicates different analysis parameters than those for visitors of the physical location, e.g., customers.

The criteria can indicate a clothing color, e.g., uniform color, type of clothing, e.g., apron or hat, a clothing logo, name tag, or other appropriate criteria that the analysis system uses to determine that a blob represents a type of person should generate different alerts or no alerts. The analysis system can use a clothing color-based tracking engine, e.g., as part of the object tracking engine, to learn criteria such as uniform color that represent the type of person.

When the analysis system detects this type of person, the analysis system can associate a specific identifier, type of identifier, or label with the blob for the person. The analysis system can use the identifier or label for further processing of the blob.

For example, when the analysis system determines that a blob satisfies a distance criteria with respect to another blob, the analysis system can determine whether the blob is for the type of person for which special analysis applies. Upon determining that the blob represents the specific type of person, the analysis system can determine to skip generating an alert or skip performing another automated action.

In some implementations, the process 300 may include generating alerts based on a number of people in a group. For example, the analysis system may send an alert when a number people in a group exceeds a local policy limit on group size. In some implementations, the process 300 may include providing information regarding the number of people in a group. For example, the analysis system may generate a report that states the average group size per hour and per week, and a total group count per hour and per week.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a camera, a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A computer-implemented method comprising:
   determining, using one or more first frames of a video sequence, that two people each of whom is depicted in at least one of the first frames satisfy a grouping criteria that indicates that the two people should be grouped for video analysis;
   after determining that the two people satisfy the grouping criteria, determining, using one or more second frames of the video sequence at least some of which were captured after the one or more first frames and which depict at least one of the two people, that the two people satisfy a degrouping criteria that indicates that the two people should not be grouped for video analysis;
   after determining that the two people satisfy the degrouping criteria, determining, using one or more third frames of the video sequence at least some of which were captured after the one or more second frames and which depict at least one of the two people, that a physical distance between the two people violates a distance criteria; and
   in response to determining that a physical distance between the two people violates a distance criteria, providing an alert that the distance criteria is violated.

2. The method of claim 1, wherein determining, using one or more first frames of a video sequence, that two people each of whom is depicted in at least one of the first frames satisfy a grouping criteria that indicates that the two people should be grouped for video analysis comprises:
   determining that the two people are within a threshold distance for a threshold period of time.

3. The method of claim 2, wherein determining that the two people are within a threshold distance for a threshold period of time comprises:
   determining that the two people walk through an entrance together and remain together for a threshold period of time.

4. The method of claim 2, wherein determining, using one or more first frames of a video sequence, that two people each of whom is depicted in at least one of the first frames satisfy a grouping criteria that indicates that the two people should be grouped for video analysis comprises:
   determining that the two people do not correspond to a particular type of person; and
   based on determining that the two people do not correspond to a particular type of person, determining whether the two people are within the threshold distance for the threshold period of time.

5. The method of claim 1, wherein determining, using one or more first frames of a video sequence, that two people each of whom is depicted in at least one of the first frames satisfy a grouping criteria that indicates that the two people should be grouped for video analysis comprises:
   determining that the two people are both touching a particular object; and
   based on determining that the two people are both touching a particular object, determining that the two people are within a sum of a threshold distance and a length of the particular object for a threshold period of time.

6. The method of claim 1, wherein determining, using one or more first frames of a video sequence, that two people each of whom is depicted in at least one of the first frames satisfy a grouping criteria that indicates that the two people should be grouped for video analysis occurs after waiting until a distance threshold is satisfied.

7. The method of claim 1, wherein after determining that the two people satisfy the grouping criteria, determining, using one or more second frames of the video sequence at least some of which were captured after the one or more first frames and which depict at least one of the two people, that the two people satisfy a degrouping criteria that indicates that the two people should not be grouped for video analysis comprises:
   determining that the two people were more than a threshold distance apart for at least a second threshold period of time.

8. The method of claim 1, wherein the video sequence is captured by a camera at a property.

9. The method of claim 1, comprising:
   after determining that a second set of two people that did not satisfy the degrouping criteria, determining not to provide an alert when the two people of the second set return together after splitting.

10. The medium of claim 1, wherein determining, using one or more first frames of a video sequence, that two people each of whom is depicted in at least one of the first frames satisfy a grouping criteria that indicates that the two people should be grouped for video analysis comprises:
    determining that the two people are within a threshold distance for a threshold period of time.

11. A system comprising:
    one or more computers and one or more storage devices storing instructions that are operable, when executed by the one or more computers, to cause the one or more computers to perform operations comprising:
    determining, using one or more first frames of a video sequence, that two people each of whom is depicted in at least one of the first frames satisfy a grouping criteria that indicates that the two people should be grouped for video analysis;
    after determining that the two people satisfy the grouping criteria, determining, using one or more second frames of the video sequence at least some of which were captured after the one or more first frames and which depict at least one of the two people, that the two people satisfy a degrouping criteria that indicates that the two people should not be grouped for video analysis;
    after determining that the two people satisfy the degrouping criteria, determining, using one or more third frames of the video sequence at least some of which were captured after the one or more second frames and which depict at least one of the two people, that a physical distance between the two people violates a distance criteria; and
    in response to determining that a physical distance between the two people violates a distance criteria, providing an alert that the distance criteria is violated.

12. The system of claim 11, wherein determining, using one or more first frames of a video sequence, that two people each of whom is depicted in at least one of the first frames satisfy a grouping criteria that indicates that the two people should be grouped for video analysis comprises:

determining that the two people are within a threshold distance for a threshold period of time.

13. The system of claim 12, wherein determining that the two people are within a threshold distance for a threshold period of time comprises:
   determining that the two people walk through an entrance together and remain together for a threshold period of time.

14. The system of claim 12, wherein determining, using one or more first frames of a video sequence, that two people each of whom is depicted in at least one of the first frames satisfy a grouping criteria that indicates that the two people should be grouped for video analysis comprises:
   determining that the two people do not correspond to a particular type of person; and
   based on determining that the two people do not correspond to a particular type of person, determining whether the two people are within the threshold distance for the threshold period of time.

15. The system of claim 11, wherein determining, using one or more first frames of a video sequence, that two people each of whom is depicted in at least one of the first frames satisfy a grouping criteria that indicates that the two people should be grouped for video analysis comprises:
   determining that the two people are both touching a particular object; and
   based on determining that the two people are both touching a particular object, determining that the two people are within a sum of a threshold distance and a length of the particular object for a threshold period of time.

16. The system of claim 11, wherein determining, using one or more first frames of a video sequence, that two people each of whom is depicted in at least one of the first frames satisfy a grouping criteria that indicates that the two people should be grouped for video analysis occurs after waiting until a distance threshold is satisfied.

17. The system of claim 11, wherein after determining that the two people satisfy the grouping criteria, determining, using one or more second frames of the video sequence at least some of which were captured after the one or more first frames and which depict at least one of the two people, that the two people satisfy a degrouping criteria that indicates that the two people should not be grouped for video analysis comprises:
   determining that the two people were more than a threshold distance apart for at least a second threshold period of time.

18. The system of claim 11, wherein the video sequence is captured by a camera at a property.

19. The system of claim 11, the operations comprising:
   after determining that a second set of two people that did not satisfy the degrouping criteria, determining not to provide an alert when the two people of the second set return together after splitting.

20. A non-transitory computer-readable medium storing software comprising instructions executable by one or more computers which, upon such execution, cause the one or more computers to perform operations comprising:
   determining, using one or more first frames of a video sequence, that two people each of whom is depicted in at least one of the first frames satisfy a grouping criteria that indicates that the two people should be grouped for video analysis;
   after determining that the two people satisfy the grouping criteria, determining, using one or more second frames of the video sequence at least some of which were captured after the one or more first frames and which depict at least one of the two people, that the two people satisfy a degrouping criteria that indicates that the two people should not be grouped for video analysis;
   after determining that the two people satisfy the degrouping criteria, determining, using one or more third frames of the video sequence at least some of which were captured after the one or more second frames and which depict at least one of the two people, that a physical distance between the two people violates a distance criteria; and
   in response to determining that a physical distance between the two people violates a distance criteria, providing an alert that the distance criteria is violated.

\* \* \* \* \*